March. 4, 1969     W. D. KELLY     3,430,337
METHOD OF MAKING AN ARMORED CABLE
Filed Feb. 28, 1967
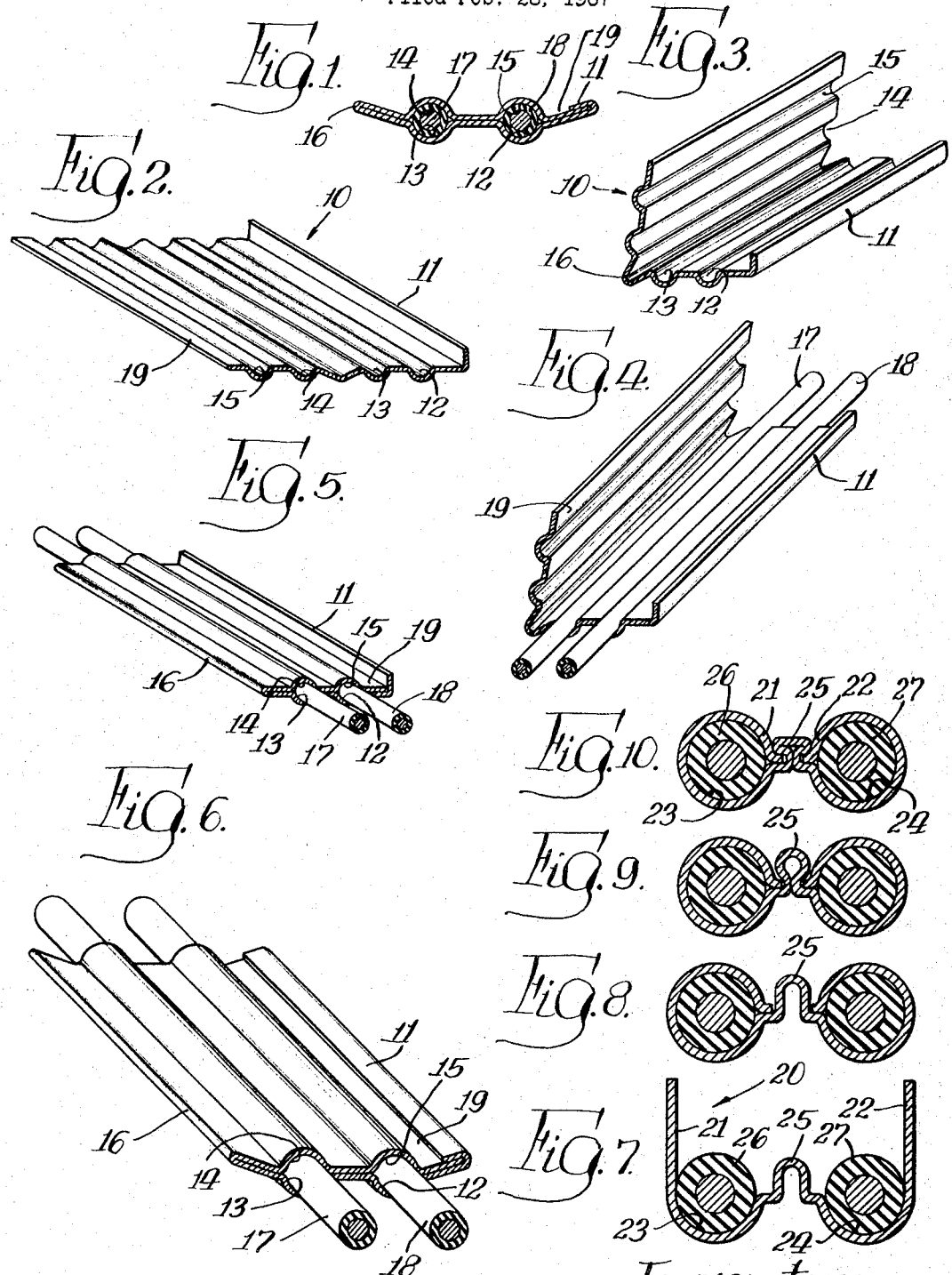
Inventor:-
William D. Kelly,
By Hofgren, Wegner, Allen,
Stellman & McCord Attys 3,430,337
METHOD OF MAKING AN ARMORED CABLE
William D. Kelly, 12 Blodgett St.,
Clarendon Hills, Ill. 60514
Filed Feb. 28, 1967, Ser. No. 619,225
U.S. Cl. 29—624     3 Claims
Int. Cl. H01b *13/22*

ABSTRACT OF THE DISCLOSURE

Methods of forming armored electrical cable. Insulated electrical wires to be armored are placed in previously formed grooves in a sheet of metal and the latter is bent and locked around the wire tightly to enclose the same and form an armored electrical cable.

---

This invention relates to an armored electrical cable and more particularly to methods of making armored electrical cable and the products resulting therefrom.

It is a general object of the present invention to provide methods for making armored electrical cables.

In my Patent No. 3,206,539 there is disclosed and claimed an armored electrical cable of new and distinct design. It comprises essentially a pair of insulated electrical wires encased in a thin metal sheath, preferably of aluminum, and so arranged that the sheath closely overlies the insulation of the wires eliminating air spaces therebetween and thereby providing an electrical cable with many advantages over the more conventional forms. Thus, there is no air and combustible paper surrounding the wire as there is, for example, in the conventional "BX" cable. Furthermore, it is not necessary to draw wires through the long lengths of a thin-wall conduit with the existing danger of scuffing through the insulating layer around the wire as a result of drawing the wire over burs or other imperfections in the conduit or connections made thereto.

The present invention relates to various methods of forming the electrical cable broadly claimed in my earlier Patent 3,206,539 and it is, therefore, one of the primary objects of the present invention to produce new methods of making armored electrical cable of the general type shown and claimed in my said patent.

Other and further objects and advantages of the present invention will be readily apparent from the following description and drawings, in which:

FIG. 1 is a section through a finished armored electrical cable made by the methods of FIGS. 2–6;

FIG. 2 is a perspective view of a sheet of metal partially pre-formed to produce pairs of valleys therein;

FIG. 3 is a view of the metal piece shown in FIG. 2 bent 90 degrees, as a step in the process of forming the cable;

FIG. 4 is like FIG. 3, illustrating a method of placing the wires in the pre-formed valleys;

FIG. 5 is a perspective view after the upstanding leg of FIG. 4 has been bent 90° to overlie the other portion of the strip;

FIG. 6 is a perspective view of the final product;

FIG. 7 is a cross-sectional view of an intermediate step wherein a strip of metal is bent into a U-shape in forming electrical cable by an alternate method;

FIG. 8 is a view like FIG. 7 showing the legs of the U bent toward each other as the succeeding step in the process;

FIG. 9 is a view like FIG. 8 showing the next succeeding step in the process;

FIG. 10 is a view like FIG. 9 showing the final product.

While this invention is susceptible to embodiment in many different forms, there are shown in the drawings and will herein be described several embodiments, with the understanding that the present disclosure is to be considered as an exemplification of the principles of the invention and is not intended to limit the invention to the embodiments illustrated. The scope of the invention will be pointed out in the appended claims.

Referring now to FIGS. 2–6 of the drawings, there is shown a portion of an elongated strip 10 of metal, preferably aluminum, formed with an up-turned edge 11 and two pairs of valleys 12, 13 and 14, 15. The formation of the valleys and the up-turned edge is accomplished in a previous step by well known methods. The sheet 10 is then bent along an intermediate portion 16 at an angle of approximately 90 degrees as shown in FIG. 3. This forms the elongated strip 10 into a generally U-shaped form having a short upstanding leg 11 and an opposite longer upstanding leg in which the valleys 14 and 15 are formed. A pair of insulated electrical wires 17, 18 are laid in the valleys 12, 13. The 90 degree bend along portion 16 is then increased to a 180 degree bend to produce the product shown in FIG. 6. It will be noted that in completing the bend the valleys 13 and 14, and 12 and 15 match to form a channel completely enclosing the wires 17 and 18 therein. The edge 11 is then bent 90 degrees to overlie the edge portion 19 of the opposite leg thereby locking the same in position and producing the final product of FIG. 6.

An alternate method of forming the armored electrical cable is shown in FIGS. 7–10. As shown therein an elongated strip 20 of metal, also preferably aluminum, is formed generally into a U shape with legs 21 and 22. Formed in the strip 20 are the valleys 23 and 24 lying on opposite sides of an intermediate rib 25. Insulated electrical wires 26 and 27 are laid in the valleys and the legs 21 and 22 bent therearound as shown in FIG. 8. By applying side pressure the terminal edges of the legs are moved toward each other thereby compressing the lower part of the rib 25 into the shape shown in FIG. 9. By flattening the rib, the legs are locked in position as shown in FIG. 10 thereby completing the product.

It can be seen from the foregoing that I have provided several different methods of manufacturing the new conductor. Common in all the methods is the formation of the strip of metal into a U, providing the same with valleys in which the wires are laid, and then folding the legs of the U toward each other to encase or completely enclose the wire. Various means are then provided for locking the legs in position to accomplish the final result.

In each instance, the advantages of my new construction are achieved. For example, when it is desired to strip the wires to form a connection, the metal coating can easily be removed simply by using a shears to cut down the web of metal which spaces the two wires apart. With the web cut, the aluminum cover can easily be stripped for the length of the cut thereby exposing the insulation on the wires.

In utilizing the normal metal rolling methods commonly in use for venting and otherwise forming metal strips of the type used in conjunction with the present invention, it is preferred that the metal be rolled or bent so as to closely overlie the wires, substantially eliminating pockets of air entrapped inside the sheath. The elimination of air, particularly of the oxygen therein, preserves the insulation against attack especially in areas where high temperatures may exist.

Furthermore, the absence of oxygen eliminates the danger of fire occurring beneath the sheath as little or no combustion supporting oxygen is present.

While the sheath is normally in full contact with the outer surface of the insulation surrounding the wires so as to eliminate air pockets, it is not crimped around the wires so tightly as to prevent at least some relative movement between the sheath and insulation which occurs from time to time with changes in temperature.

I claim:

1. The method of encasing a pair of electrical wires in a metal sheath which comprises, forming an elongated strip of metal generally into the shape of a U, forming one pair of valleys in the base of the U and a second pair of valleys in an upstanding leg of the U, laying a pair of insulated electrical wires in one pair of valleys, folding said upstanding leg of the U toward the base to bring the pairs of valleys into juxtaposition to form a channel with the wires enclosed therein, and then bending the edge of one leg over the adjacent edge of the other leg to lock the legs in folded position.

2. The method of encasing a pair of electrical wires in a metal sheath which comprises, forming an elongated strip of metal generally into the shape of a U, forming a pair of parallel spaced apart valleys in the bottom of the U, forming a rib in the bottom of the U between the valleys, laying a pair of insulated electrical wires in said valleys, folding the legs of the U toward each other and over the wires to encase the same in the metal, urging the legs toward each other to compress the bottom of the rib, and then flattening the rib over the terminal edges of the legs to lock the same in folded position.

3. The method of encasing a pair of electrical wires in a metal sheath which comprises, forming an elongated strip of metal generally into the shape of a U, forming a pair of parallel spaced apart valleys in the bottom of the U, forming a rib in the bottom of the U between the valleys, laying a pair of insulated electrical wires in said valleys, folding the legs of the U toward each other and over the wires to encase the same in the metal, and then flattening the rib over the terminal edges of the legs to lock the same in folded position.

References Cited

UNITED STATES PATENTS

| 1,840,536 | 1/1932 | Shore | 174—103 X |
| 1,949,077 | 2/1934 | Kalischer | 174—103 |

FOREIGN PATENTS

| 227,611 | 10/1910 | Germany. |
| 2,532 | 1881 | Great Britain. |

LARAMIE E. ASKIN, *Primary Examiner.*

U.S. Cl. X.R.

29—552; 156—54, 55; 174—103, 117